United States Patent
Zhang et al.

(10) Patent No.: US 6,643,589 B2
(45) Date of Patent: Nov. 4, 2003

(54) SIMULTANEOUS DETERMINATION OF FORMATION ANGLES AND ANISOTROPIC RESISTIVITY USING MULTI-COMPONENT INDUCTION LOGGING DATA

(75) Inventors: Zhiyi Zhang, Houston, TX (US); Liming Yu, Stafford, TX (US); Leonty Abraham Tabarovsky, Houston, TX (US); Berthold Kriegshauser, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/091,310

(22) Filed: Mar. 5, 2002

(65) Prior Publication Data

US 2002/0173914 A1 Nov. 21, 2002

Related U.S. Application Data

(60) Provisional application No. 60/274,293, filed on Mar. 8, 2001.

(51) Int. Cl.⁷ ................................................. G01V 3/18
(52) U.S. Cl. ............................................. 702/7; 702/10
(58) Field of Search .............................. 702/6, 7, 10, 11; 324/339, 343

(56) References Cited

U.S. PATENT DOCUMENTS

| | | | |
|---|---|---|---|
| 5,329,448 A | 7/1994 | Rosthal | 364/422 |
| 5,656,930 A | 8/1997 | Hagiwara | 324/339 |
| 5,886,526 A * | 3/1999 | Wu | 324/338 |
| 5,900,733 A | 5/1999 | Wu et al. | 324/338 |
| 5,999,883 A | 12/1999 | Gupta et al. | 702/7 |
| 6,092,024 A | 7/2000 | Wu | 702/7 |
| 6,147,496 A | 11/2000 | Strack et al. | 324/343 |
| 6,502,036 B2 * | 12/2002 | Zhang et al. | 702/7 |

OTHER PUBLICATIONS

K. S. Kunz et al., *Some Effects of Formation Anisotropy on Resistivity Measurements in Boreholes*, Geophysics, vol. XXIII, No. 4 (Oct., 1958) pp. 770–794, 10 Figs.

J. H. Moran et al., *Effects of formation anisotropy on resistivity–logging measurements*, Geophysics, vol. 44, No. 7, (Jul. 1979), pp. 1266–1286, 21 Figs. 4 Tables.

\* cited by examiner

Primary Examiner—Donald E. McElheny, Jr.
(74) Attorney, Agent, or Firm—Madan, Mossman & Sriram, P.C.

(57) ABSTRACT

Measurements made by a multicomponent logging tool in a borehole are inverted to obtain horizontal and vertical resistivities and formation dip and azimuth angles of a formation traversed by the borehole. The inversion is performed using a generalized Marquardt-Levenberg method. In this generalized Marquardt-Levenberg method, a data objective function is defined that is related to a difference between the model output and the measured data. The iterative procedure involves reducing a global objective function that is the sum of the data objective function and a model objective function related to changes in the model in successive iterations. In an alternate embodiment of the invention, the formation azimuth angle is excluded from the iterative process by using derived relations between the multicomponent measurements.

17 Claims, 7 Drawing Sheets

SIMULTANEOUS DETERMINATION OF FORMATION ANGLES AND ANISOTROPIC RESISTIVITY USING MULTI-COMPONENT INDUCTION LOGGING DATA

CROSS-REFERENCES TO RELATED APPLICATIONS

This application claims priority from U.S. Provisional Patent Application Ser. No. 60/274,293 filed on Mar. 8, 2001.

BACKGROUND OF THE INVENTION

1. Field of the Invention

The invention is related generally to the field of interpretation of measurements made by well logging instruments for the purpose of determining the properties of earth formations. More specifically, the invention is related to a method for simultaneous determination of formation angles and anisotropic formation resistivity using multi-component resistivity data.

2. Background of the Art

Electromagnetic induction and wave propagation logging tools are commonly used for determination of electrical properties of formations surrounding a borehole. These logging tools give measurements of apparent resistivity (or conductivity) of the formation that when properly interpreted are diagnostic of the petrophysical properties of the formation and the fluids therein.

The physical principles of electromagnetic induction resistivity well logging are described, for example, in, H. G. Doll, Introduction to Induction Logging and Application to Logging of Wells Drilled with Oil Based Mud, Journal of Petroleum Technology, vol. 1, p. 148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. Nos. 4,837,517; 5,157,605 issued to Chandler et al, and U.S. Pat. No. 5,452,761 issued to Beard et al.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art these eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones which are typically hydrocarbon-bearing and are of the most interest to the instrument user. Some earth formations which might be of commercial interest therefore may be overlooked by interpreting a well log made using the electromagnetic induction resistivity well logging instruments known in the art.

The effect of formation anisotropy on resistivity logging measurements have long been recognized. Kunz and Moran studied the anisotropic effect on the response of a conventional logging device in a borehole perpendicular to the bedding plane of t thick anisotropic bed. Moran and Gianzero extended this work to accommodate an arbitrary orientation of the borehole to the bedding planes.

Rosthal (U.S. Pat. No. 5,329,448) discloses a method for determining the horizontal and vertical conductivities from a propagation or induction well logging device. The method assumes that θ, the angle between the borehole axis and the normal to the bedding plane, is known. Conductivity estimates are obtained by two methods. The first method measures the attenuation of the amplitude of the received signal between two receivers and derives a first estimate of conductivity from this attenuation. The second method measures the phase difference between the received signals at two receivers and derives a second estimate of conductivity from this phase shift. Two estimates are used to give the starting estimate of a conductivity model and based on this model, an attenuation and a phase shift for the two receivers are calculated. An iterative scheme is then used to update the initial conductivity model until a good match is obtained between the model output and the actual measured attenuation and phase shift.

Hagiwara shows that the log response of an induction-type logging tool can be described by an equation of the form $$V \propto \frac{i}{L^3}(-2e^{ikL}(1-ikL)+ikl(e^{ik\beta}-e^{ikL})) \quad (1)$$

where $$\beta^2 = \cos^2\theta + \sin^2\theta \quad (2)$$

and $$k^2 = \omega^2\mu(\epsilon_h + i\sigma_h/\omega)) \quad (3)$$

where L is the spacing between the transmitter and receiver, k is the wavenumber of the electromagnetic wave, $\mu$ is the magnetic permeability of the medium, θ is the deviation of the borehole angle from the normal to the formation, λ is the anisotropy factor for the formation, ω is the angular frequency of the electromagnetic wave, oh is the horizontal conductivity of the medium and $\epsilon_h$ is the horizontal dielectric constant of the medium.

Eq. (3) is actually a pair of equations, one corresponding to the real part and one corresponding to the imaginary part of the measured signal, and has two unknowns. By making two measurements of the measured signal, the parameters k and β can be determined. The two needed measurements can be obtained from (1) R and X signals from induction logs, (2) phase and attenuation measurements from induction tools, (3) phase or attenuation measurements from induction tools with two different spacings, or (4) resistivity measurements at two different frequencies. In the low frequency limit, $\epsilon$ can be neglected in Eq. (3) and from known values of ω and $\mu$, the conductivity a can be determined from k, assuming a value of $\mu$ equal to the permittivity of free space Wu (U.S. Pat. No. 6,092,024) recognized that the solution to eqs. (1)–(3) may be nonunique and showed how this ambiguity in the solution may be resolved using a plurality of measurements obtained from multiple spacings and/or multiple frequencies.

Strack et al. (U.S. Pat. No. 6,147,496) describe a multicomponent logging tool comprising a pair of 3-component transmitters and a pair of 3-component receivers. Using measurements made at two different frequencies, a combined signal is generated having a reduced dependency on the electrical conductivity in the wellbore region.

U.S. Pat. No. 5,999,883 issued to Gupta et al, (the "Gupta patent"), the contents of which are fully incorporated here by reference, discloses a method for determination of an initial estimate of the horizontal and vertical conductivity of anisotropic earth formations. Electromagnetic induction signals induced by induction transmitters oriented along three mutually orthogonal axes are measured. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to a one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes which is parallel to the axis of the instrument is calculated, from the rotated magnitudes, with respect to a direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter. One drawback in the teachings of Gupta et al is that the step of determination of the relative angle of inclination of the requires measurements of three components of data with substantially identical transmitter-receiver spacings. Because of limitations on the physical size of the tools, this condition is difficult to obtain; consequently the estimates of resistivities are susceptible to error.

There is a need for a method of simultaneous determination of formation angles and anisotropic resistivity that does not require measurements made with matched transmitter-receiver spacings. Such a method should preferably computationally efficient. The present invention satisfies this need.

SUMMARY OF THE INVENTION

The present invention is a method for the simultaneous inversion of measurements made by a multicomponent logging tool to obtain a layered resistivity model and formation inclination angle and azimuth. A model that includes horizontal and vertical resistivities is used to generate a simulated tool response. An iterative solution that gives an improved match between the model output and the field observations is obtained using a global objective function. The global objective function is defined as a sum of a data objective function (difference between the model output and the observed data) and a model objective function that stabilizes the inversion procedure by placing a penalty on large changes in the model at each iteration. The measurements may be made by an electromagnetic logging tool having an axis inclined to the normal to the bedding planes of the formation. The logging tool includes transmitters and/or receivers with coils inclined to the axis of the tool. In a preferred embodiment of the invention, the data objective function is defined in the coil coordinate system. Surveying of the borehole and orientation sensors on the tool provide the necessary information for rotating the model output to the coil coordinate system.

BRIEF DESCRIPTION OF THE FIGURES

The present invention is best understood with reference to the following figures in which like numbers refer to like components.

DETAILED DESCRIPTION OF THE INVENTION

Figure 1:
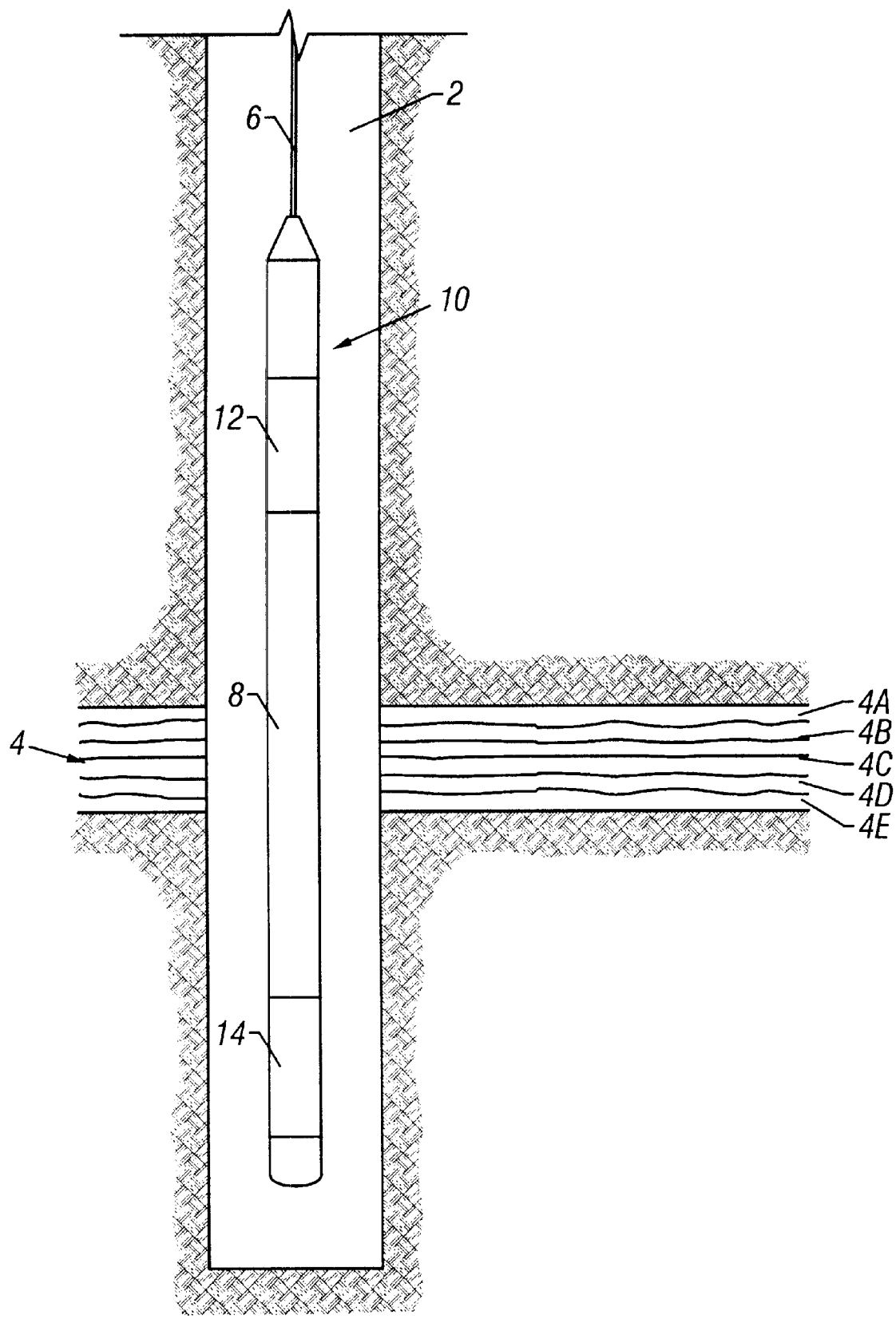
FIG. 1 shows an induction instrument disposed in a wellbore penetrating earth formations.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by means of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
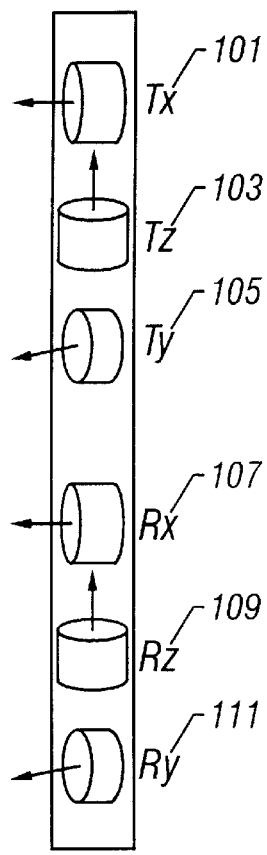
FIG. 2 shows the arrangement of transmitter and receiver coils in a preferred embodiment of the present invention marketed under the name 3DExplorer™

Referring to FIG. 2, the configuration of transmitter and receiver coils in a preferred embodiment of the 3DExplorer™ induction logging instrument of Baker Hughes is shown. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. In a preferred mode of operation of the tool, the $H_{xx}$, $H_{yy}$, $H_{zz}$, $H_{xy}$, and $H_{xz}$ components are measured, though other components may also be used.

Figure 3A:
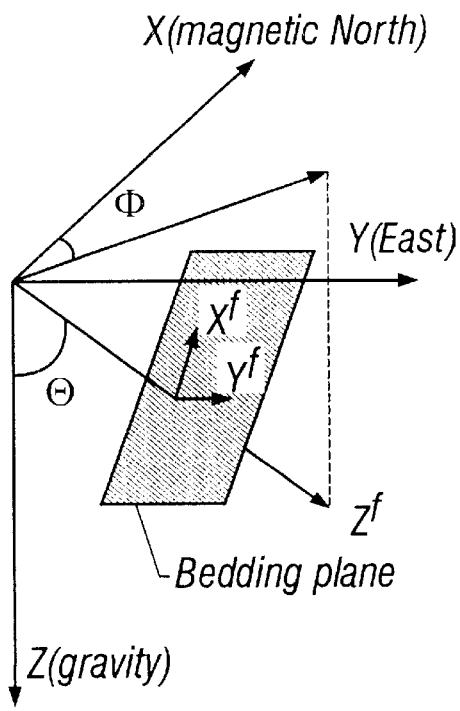
FIG. 3a and 3b shows the angles of relevance in a multicomponent logging tool in an inclined borehole.
Figure 3B:
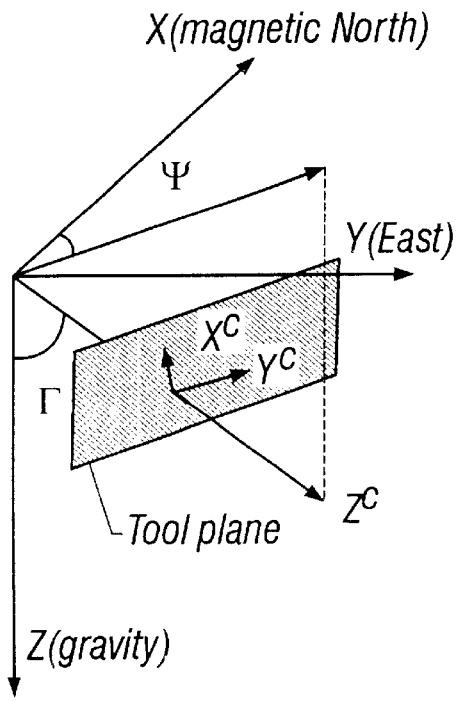

There are four coordinate systems involved in the processing of multicomponent induction logging data, which are the earth, formation, tool, and coil coordinate systems, respectively. The earth coordinate system comprises the z-axis in the direction of gravity, the x-axis pointing to the magnetic North, and the y-axis in the direction of magnetic East. The other three coordinate systems are defined in the earth coordinate system. FIG. 3a shows the formation coordinate system. The z-axis of the formation coordinate system, $Z^f$, is normal to the bedding plane, while $X^f$ and $Y^f$ are on the bedding plane. The two formation angles, $\Theta$ and $\Phi$, are to be recovered from our inversion processing. The tool coordinate system is described by ($X^t$, $Y^t$, $Z^t$) in FIG. 3b. The z-axis of the tool system is normal to the tool plane and $X^t$ and $Y^t$ are on the tool plane. The dip and azimuth angles for the borehole trajectory are denoted by $\Psi$ and $\Gamma$ respectively. The data are measured in the coil coordinate system ($X^c$, $Y^c$, $Z^c$) that shares the same z-axis with the tool coordinate system.

Figure 4:
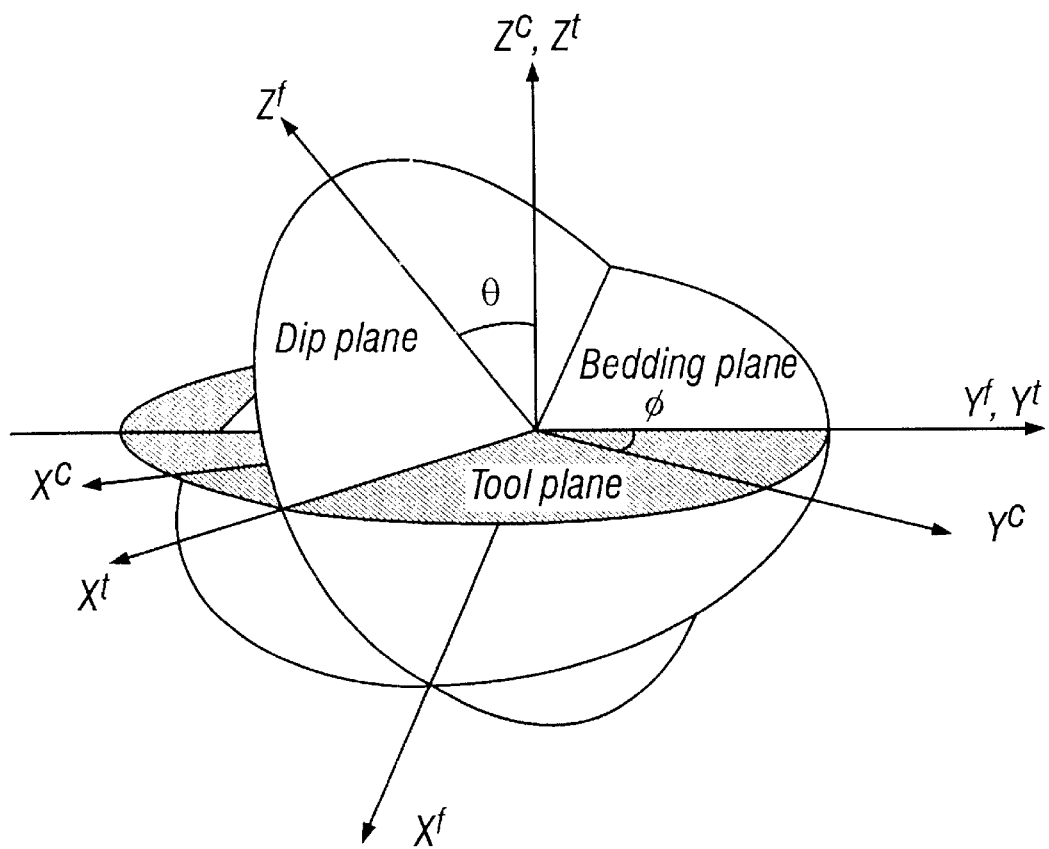
FIG. 4 shows the relation between the formation coordinates and the tool and coil coordinates.

The forward modeling method used in this paper is the one developed by Epov et al. (1997), which requires the input of relative dip and rotation angles under the formation coordinate system (FIG. 4). This requires determination of the relative dip and azimuth angles using $\Theta$, $\Phi$, $\Gamma$ and $\Psi$ as outlined in Appendix A. Once the data are generated under the formation coordinate system, two rotations are performed to convert the data from formation system to the coil system. The magnetic field data are first rotated from the formation coordinate system into an intermediate magnetic field, $H^t$, on the tool plane Any magnetic field component $H^f$ in the formation coordinate system can be rotated to an intermediate magnetic field $H^t$ by the rotation $$H^t = R_\theta^T H^f R_\theta \tag{4}$$

where the rotation matrix $R_\theta$ is given by $$R_\theta = \begin{bmatrix} \cos\theta & 0 & \sin\theta \\ 0 & 1 & 0 \\ -\sin\theta & 0 & \cos\theta \end{bmatrix} \tag{5}$$

The intermediate magnetic field is further related to the measured magnetic field $H^c$ by $$H^c = R_\phi^T H^t R_\phi \tag{6}$$

where $$R = \begin{bmatrix} \cos\phi & \sin\phi & 0 \\ -\sin\phi & \cos\phi & 0 \\ 0 & 0 & 1 \end{bmatrix} \tag{7}$$

The formation angles may then be calculated as (see Appendix B)

$$\tan 2\theta = \frac{2H_{xz}^t}{H_{xx}^t - H_{zz}^t} \tag{8}$$

and $$\tan 2\phi = \frac{2H_{xy}^c}{H_{xx}^c - H_{yy}^c} \tag{9}$$

This is the method used in Gupta and, as noted above, requires that all field components involved must be measured at the same spacing. This is difficult to achieve in practice, and, in the present invention, the angles $\theta$ and $\Phi$ are determined simultaneously along with the resistivity parameters.

Figure 5:
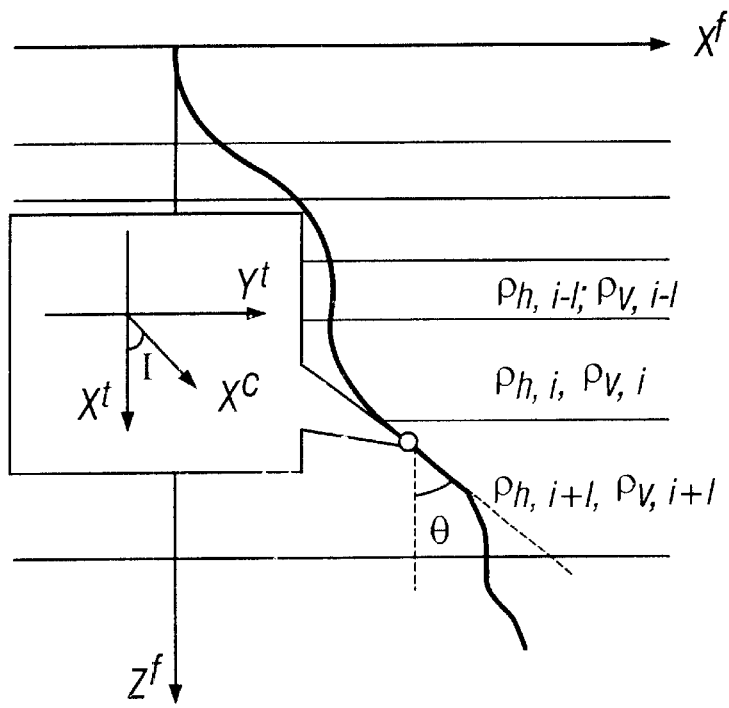
FIG. 5 is a schematic illustration of the model parameters in an embodiment of the inventions.

After conversion, the 3D coordinate system is reduced to a 2D system described by relative dip $\theta$ and relative azimuth angle $\phi$. This is shown in in FIG. 5. The horizontal axis 151 is the x-axis $X^f$ in the formation coordinate system and the vertical axis 153 is the z-axis $Z^f$ in the formation coordinate system. The model is a 1-D model with layers 1, 2, . . . 1, l+1 . . . , the individual layers being characterized by horizontal and vertical resistivities $\rho_{h,i}$ and $\rho_{v,i}$.

The data D in an induction logging experiment can be expressed as a nonlinear function of the model parameters m via a nonlinear function $$D = f(m) \tag{10}$$

where $m = (\Theta\Phi, \rho_h, \rho_v)$ where $f$'s are vectors of horizontal and vertical resistivities in the model. In a preferred embodiment of the model, the angles $\Theta$ and $\Phi$ are defined with respect to an absolute coordinate system where the z-axis is the vertical, and the x-axis is the true north, though any other reference coordinate system may be used.

The ultimate goal of inversion is to recover $\Theta$ and $\Phi$ in additional to the resistivity structure. There are two possible ways to recover formation angle information. The first one is to include the absolute formation angles, $\Theta$ and $\Phi$, in the model objective function and recover them directly from the inversion. The second method is to solve for the relative formation dip angle first, and then recover absolute formation dip and azimuth angles via a post inversion procedure.

The model parameters may be determined by first defining a data objective function $O_d$:

$$O_D = \|W(D^{obs} - D)\|^2 \tag{11}$$

where $D^{obs}$ and D are the observed data and the data predicted from the model respectively, and $W_d$ is a suitable weighting matrix.

Those versed in the art would recognize that attempting an optimization procedure with respect an objective function such as that given by eq. (11) relative to the model parameters may involve numerical instabilities. Prior art methods have attempted to reduce these instabilities by selecting step factors that are used to update the model parameters. The present invention uses a different procedure for this stabilization by including, in the objective function, quantities that are related to the model itself. It is desirable that the model $m^n = (\Theta^n, \Phi^n, \rho_h^n, \rho_v^n)$ at the n-th iteration be close to the model $m^{n-1} = (\Theta^{n-1}, \Phi^{n-1}, \rho_h^{n-1}, \rho_v^{n-1})$ at the (n−1)-th iteration.

In one embodiment of the invention, this is done by defining separate objective functions are defined for the horizontal and vertical resistivities, formation dip and formation azimuth as:

$$O_h = \int w \left| \ln\left(\frac{\rho_h^n}{\rho_h^{n-1}}\right) \right|^2 dv \tag{12}$$

$$O_v = \int w_v \left| \ln\left(\frac{\rho_v^n}{\rho_v^{n-1}}\right) \right|^2 dv \tag{13}$$

$$O_\Theta = \int w_\Theta \left| \ln\left(\frac{\Theta_n}{\Theta^{n-1}}\right) \right|^2 dv \tag{14}$$

and $$O_\Phi = \int w_\Phi \left| \ln\left(\frac{\Phi_n}{\Phi^{n-1}}\right) \right|^2 dv \tag{15}$$

The use of logarithmic functions ensures non-negative solution of the recovered model and allows the model parameters for resistivity, dip angles and thicknesses to span the same numerical range in the inversion.

The model objective function is then defined as $$O_m = \alpha_h O_h + \alpha_v O_v + \alpha_\Theta O_\Theta + \alpha_\phi O_\phi \tag{16}$$

where the five coefficients $\alpha_h$, $\alpha_v$, $\alpha_\Theta$ and $\alpha_\Phi$ are determined from the following conditions:

$$\alpha_h O_h = \alpha_v O_v = \alpha_\Theta O_\Theta = \alpha_\Phi O_\Phi \tag{17}$$

i.e., the contributions to the cost function from the four components are substantially the same at each iteration.

The solution to eq. (18) is $$\alpha_h = \frac{O_v O_\Theta O_\phi}{\Sigma} \tag{18}$$

with $$\Sigma = O_h O_v O_\Theta + O_h O_v O_\Phi + O_v O_\Theta O_\Phi \tag{19}$$

and similar expressions for the remaining α coefficients.

The four weighting coefficients are calculated and updated at each iteration. Then for the preferred embodiment, $$O_h = \left\| W_h \ln\left(\frac{\rho_h^n}{\rho_h^{n-1}}\right) \right\|^2 \tag{20}$$

$$O_v = \left\| W_v \ln\left(\frac{\rho_v^n}{\rho_v^{n-1}}\right) \right\|^2 \tag{21}$$

$$O_\theta = \left\| \ln\left(\frac{\theta^n}{\theta^{n-1}}\right) \right\|^2 \tag{22}$$

and $$O_\phi = \left\| \ln\left(\frac{\phi^n}{\phi^{n-1}}\right) \right\|^2 \tag{23}$$

and the four weighting coefficients are of the form given by eqs. (18) and (19).

This gives a model objective function of the form $$O_m = \alpha_h O_h + \alpha_v O_v + \alpha_\Theta O_\Theta + \alpha^\Phi O_\Phi \tag{24}$$

A global objective function is then defined as a combination of the data objective function from eq. (10) and the model objective function from eq. (25) as $$O = O_m + \beta^{-1}(O_d - O^{tar}) \tag{25}$$

where $\beta^{-1}$ is the Lagrangian multiplier and $O^{tar}$ is the target misfit level (a noise level).

The nonlinear problem of optimizing eq. (26) is done by using linearization in an iterative process. The global objective function at the n+1 iteration is given by $$O = \|W_m[\delta m + m^{(n)} - m_0]\|^2 + \beta^{-1}\{\|W_d(D^{obs} - f[m^{(n)}] + J\delta m)\|^2 - O^{tar}\} \tag{26}$$

where $J = [J_h, J_v, J_\Theta, J_\Phi]$ is the global sensitivity matrix. The sensitivities for horizontal and vertical resistivity are generated using an adjoint Green's function solution while the sensitivities for the formation angles are calculated using a finite difference method.

The global model weighting matrix is given by $$W_m = \begin{bmatrix} \sqrt{\alpha_h} W_h & 0 & 0 & 0 \\ 0 & \sqrt{\alpha_v} W_v & 0 & 0 \\ 0 & 0 & \sqrt{\alpha_\theta} & 0 \\ 0 & 0 & 0 & \sqrt{\alpha_\phi} \end{bmatrix} \tag{27}$$

Those versed in the art would recognize that if all the α's are set equal to 1, the matrices $W_h$ and $W_v$ are set equal to unitary matrices and if $\sigma^{tar} = 0$, then the inversion method of the present invention is equivalent to the prior art Marquardt-Levenberg method. For this reason, the method of the present equation described above may be called a generalized Marquardt-Levenberg method. With increasing iterations, the global objective function is weighted more and more towards the data misfit term so that when the solution is close to the optimal, the global objective function is substantially equal to the data objective function.

Even though it is possible to invert the 3DEX data to simultaneously recover formation dip and azimuth angles as well as horizontal and vertical resistivity, reduction in the number of inversion parameters is still welcome for reducing the computational time. We may exclude formation azimuth angle from the inversion scheme using the following relations from Appendix B:

$$H_{xx}^c + H_{yy}^c = H_{xx}^t + H_{yy}^t$$

$$H_{zz}^c = H_{zz}^t \tag{28}$$

Eq. (28) indicates that the sum of the xx- and yy- components of the measured magnetic field inside a layered earth is irrelevant to the determination of φ. Further more, we note that $H^t_{xx} = H^t_{yy}$ at $\Phi = 45°$.

In an alternate embodiment of the invention, we use $H^c_{zz}$ and $(h^c_{xx}+H^c_{yy})/2$ as the data in the inversion and fix the rotation angle $\phi$ at 45°, and exclude formation azimuth angle as inversion parameter. This is compromised with the exclusion of the two cross components from the inversion. Given the fact that the cross components usually have much lower signal-to-noise ratio than the three main components, their exclusion from 1D inversions do not significantly affect the final results. In an alternate embodiment of the invention, in addition to the three main components, measurements are also made the xy- and yx-components, and use is made of the following relationships to include cross components in the inversion (Appendix B):

$$Hc_{yz}^c - H_{xy}^c = H_{xy}^t - H_{yz}^t \tag{29}$$

Note that the coil separations for yz- and xy-components must be the same in order to make use of eq. (28). The signal level of cross components over 1D earth are usually much smaller than those of three main components, and subtraction of these cross component in Eq. (29) may further reduce the signal to noise ratio of the data. This means that in order to take advantages of Eq. (29), the data quality for cross components must be high.

The objective function for this alternate embodiment of the invention becomes $$O_m = \alpha_h O_h + \alpha_v O_v + \alpha_\Theta O_\Theta \tag{30}$$

where $$\alpha_h = \frac{O_v O_\Theta}{\Sigma}, \alpha_v = \frac{O_\Theta O_h}{\Sigma}, \alpha_\Theta = \frac{O_h O_v}{\Sigma} \tag{31}$$

with $$\Sigma = O_h O_v + O_v O_\Theta + O_\Theta O_v \tag{32}.$$

After $\Theta$ is obtained by the inversion procedure, a post inversion procedure described in Appendix C is used to extract information about the absolute formation dip and azimuth.

Figure 8:
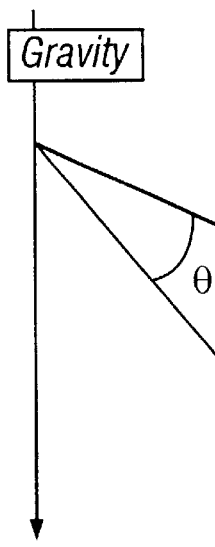
FIG. 8 shows the relative dip angle between the formation ($Z^f$) and the trajectory ($Z^c$).
Figure 9:
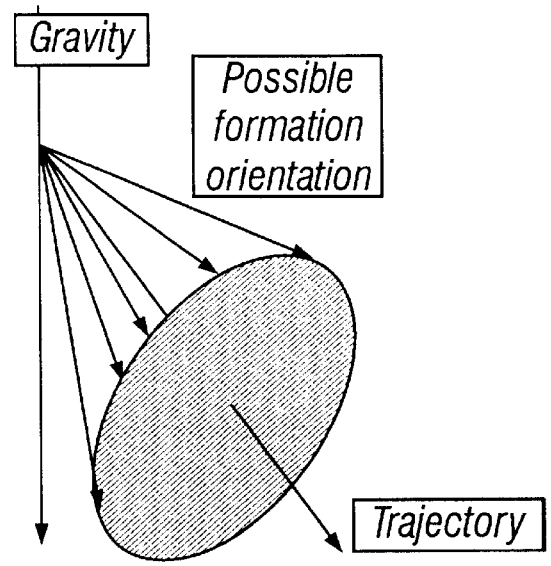
FIG. 9 shows the relative rotation angle between the formation ($Y^f$) and the trajectory ($Y^c$).

In yet another embodiment of the invention, the objective function described immediately above by eqs. (30)–(32) is used with the inversion carried out only for $\Theta$ (FIG. 8), $R_h$, and $R_v$. A possible range of $\Phi$ is obtained from geologic and geophysical information and $\Phi$ is digitized into N discrete values $\Phi = [\Phi_1, \Phi_2, \Phi_3, \ldots \Phi_n]$ (FIG. 9). For each of these discrete values of $\Phi_1$, an inversion is performed for $\Theta$, $R_h$, and $R_v$ and the data misfit determined for each of these discrete values. On the basis of these individual inversions, the model with the least data misfit (smallest value of the data objective function) is selected. Those versed in the art would recognize that inclusion of the model objective function in the iterative process is primarily for the purpose of stabilizing the inversion.

EXAMPLE

Figure 10:
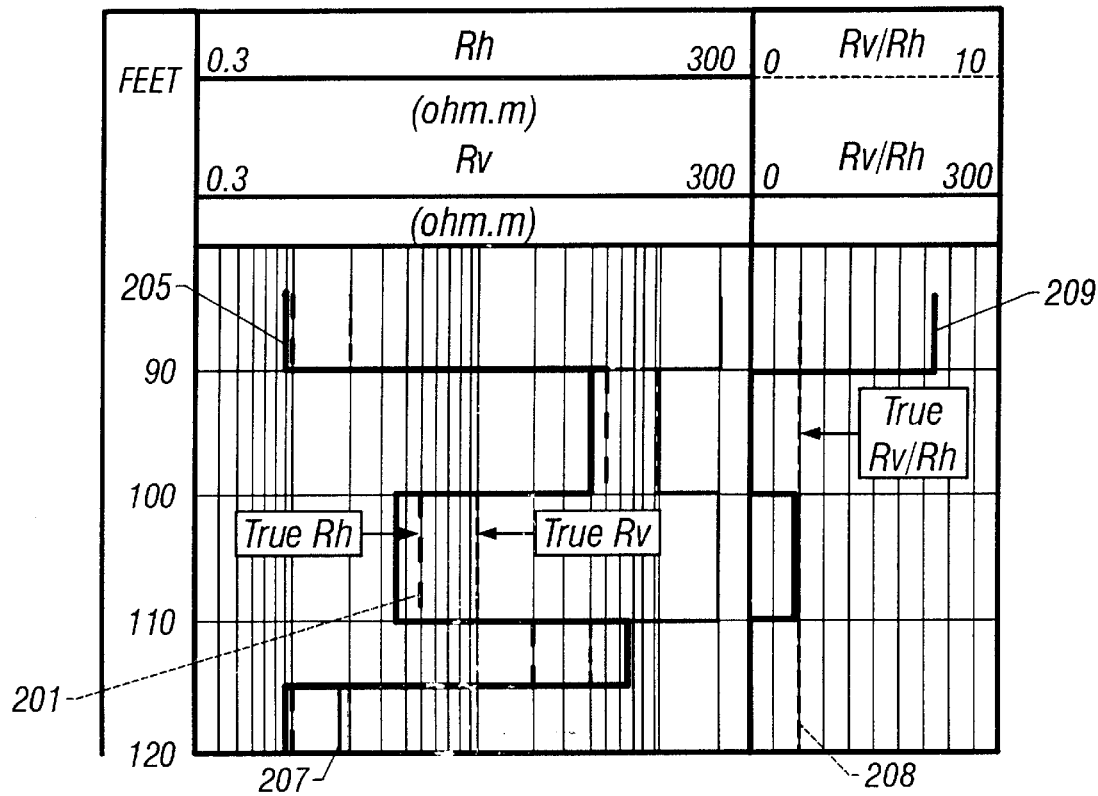
FIG. 10 shows a model used to illustrate the method of the present invention and the result of inversion of the model output using prior art methods with an incorrect inclination angle.

The results of using the method of the present invention are illustrated by an example. FIG. 10 shows an example of a resistivity model in which there is a constant value of $R_v/R_h$ of 2.0 as indicated by 208 in the right track. The left track shows the actual values of $R_v$ 203 and $R_h$ 205.

Synthetic data were generated for an inclination angle of 60°. The curves 207 and 205 in FIG. 10 show the results of a inverting the synthetic model output wherein an incorrect inclination angle of 55° was assumed and the inversion was limited to determination of the resistivity values only, i.e., the inclination angle was not included in the inversion process. The inversion was carried out using prior art methods. The curve 209 shows the determined value of $R_v/R_h$ using the incorrect inclination angle. It is clear that not including the inclination angle in the inversion process leads to large errors in the inversion if a wrong value of the inclination angle is assumed.

Figure 11:
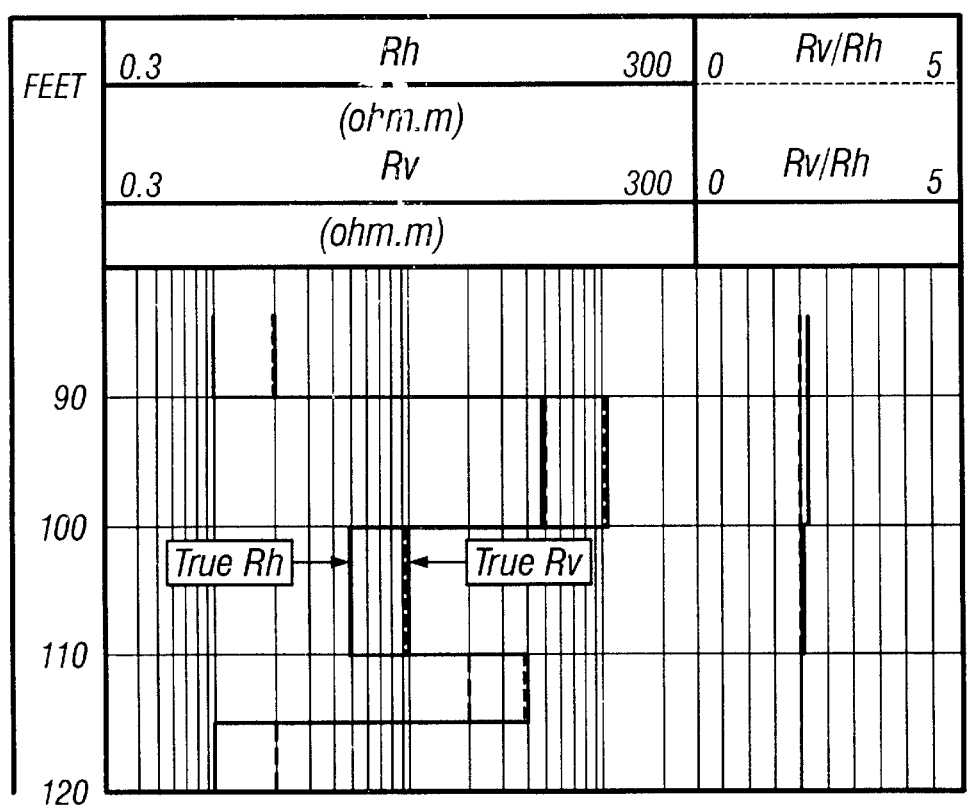
FIG. 11 shows a comparison between the model and the results of using the present invention on simulated measurements.

FIG. 11 shows the result of inverting the synthetic model data generated using the model shown in FIG. 10 using the present method, i.e., a simultaneous inversion of resistivity and angles. The initial values for both $\rho_h$ and $\rho_v$ are 5 ohm-m whole-space, and the starting value for relative dip is 75°. The standard deviation is set to 1% of the data strength plus a negligible constant base value of $10^{-7}$ A/m. This constant threshold can effectively handle zero-crossings on Hxx, Hyy, Hxy, and Hxz components. The inversion converged to the desired misfit level after 9 iterations. The recovered resistivity model in FIG. 11 is a good representation of the true model. The anisotropy ratio has been perfectly resolved. The recovered relative dip is 60.06°.

Figure 12:
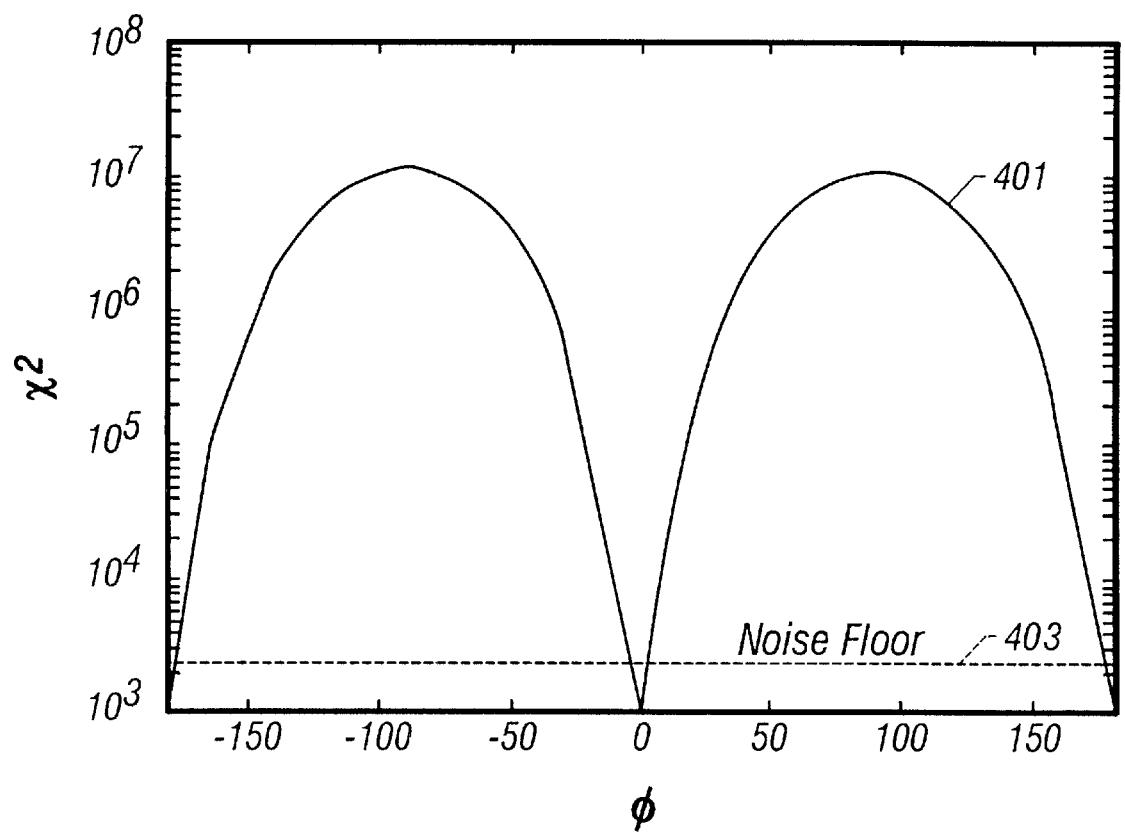
FIG. 12 shows the residual error as a function of azimuth.

To illustrate how to recover information about relative azimuth angle, we calculate the $\chi^2$-misfit as the function of relative azimuth in FIG. 12. The $\chi^2$-misfit 401 reaches a minimum at the true solution $\phi = 0°$. Because the data are contaminated with noise, the inversion can only recover a narrow zone around the true solution for the relative azimuth angle. The higher the noise level 403, the wider the zone. The $\chi^2$-misfit reaches another minimum at $\phi + \pi = 180°$, since the magnetic field is symmetric over a 1D earth. Hence a priori information is needed to determine the final solution for the relative azimuth angle. This example indicates that our simultaneous inversion algorithm can effectively handle zero-crossings in the data and provide reliable information about the relative angle as well as the anisotropic resistivity structures.

The present invention has been discussed above with respect to measurements made by a transverse induction logging tool conveyed on a wireline. This is not intended to be a limitation and the method is equally applicable to measurements made using a comparable tool conveyed on a measurement-while-drilling (MWVD) assembly or on coiled tubing.

While the foregoing disclosure is directed to the preferred embodiments of the invention, various modifications will be apparent to those skilled in the art. It is intended that all variations within the scope and spirit of the appended claims be embraced by the foregoing disclosure.

APPENDIX A

Calculate $\theta$, $\Phi$, $Z^f$ and $Z^t$ in the Earth Coordinate System

The borehole trajectory is measured in the field, and at any depth alone the borehole the azimuth $\Psi$ of the borehole and its inclination and $\Gamma$ are known. The directional vector for the Z-axis of the tool coordinate system is $$Z^t = \sin \Gamma \cos \Psi \vec{i} + \sin \Gamma \sin \Psi \vec{j} + \cos \Gamma \vec{k} \tag{A-1}$$

where $\vec{i}$, $\vec{j}$, and $\vec{k}$ are the directional unit vectors along the X-, Y-, and Z-directions in the earth coordinate system. Similarly, we have for the formation coordinate system $$Z^f = \sin \Theta \cos \Phi \vec{i} + \sin \Theta \sin \Phi \vec{j} + \cos \Theta \vec{k} \tag{A-2}$$

The relative dip between $Z_f$ and $Z^t$ is $$\theta = \arccos(Z^f \cdot Z^t) \qquad \text{(A-3)}$$

Because the formation and tool coordinate systems share the same Y-axis, i.e., $Y^f = Y^t$, therefore $$Y^f = Y^t = Z^f \times Z^t \qquad \text{(A-4)}$$

where x denotes the vector cross product.

The relative azimuth angle is calculated using the measured relative bearing, $\zeta$, which is the angle between $X^t$ and high side vector of the tool plane. The high side vector, h, is the vector in the tool plane pointing to the high side of the tool. Vector h can be computed in the following manner:

When $\Gamma$ is smaller than or equal to 90°

$$h = \sin(\Gamma + 90°)\cos(\Psi)\vec{i} + \sin(\Gamma + 90°)\sin(\Psi)\vec{j} + \cos(\Gamma + 90°)\vec{k} \qquad \text{(A-5)}$$

and when $\Gamma$ is greater than 90°, $$h = \sin(270° - \Gamma)\cos(\Psi + 180°)\vec{i} + \sin(270° - \Gamma)\sin(\Psi + 180°)\vec{j} + \cos(270° - \Gamma)\vec{k} \qquad \text{(A-6)}$$

The angle between h and $Y^t$ is then $$v = \arccos(Y^t \cdot h) \qquad \text{(A-7)}$$

The relative angle is given by $$\phi = \zeta + 90° - v \qquad \text{(A-8)}$$

These two angles, $\theta$ and $\phi$, are then used in the forward modeling to generate magnetic field in the formation coordinate system.

APPENDIX B

The Exclusion of Relative Rotation Angle from Inversion

For forward modeling purposes, we need to convert the magnetic field from the formation coordinate system to the coil coordinate system. The magnetic field $H^f$ in the formation coordinate system can be rotated to an intermediate magnetic field $H^t$:

$$H^t = R_\theta^T H^f R_\theta \qquad \text{(B-1)}$$

where the rotation matrix is given by $$R_\theta = \begin{bmatrix} \cos\theta & 0 & \sin\theta \\ 0 & 1 & 0 \\ -\sin\theta & 0 & \cos\theta \end{bmatrix} \qquad \text{(B-2)}$$

$$H^f = \begin{bmatrix} H_{xx}^f & H_{xy}^f & H_{xz}^f \\ H_{yx}^f & H_{yy}^f & H_{yz}^f \\ H_{zx}^f & H_{zy}^f & H_{zz}^f \end{bmatrix} \qquad \text{(B-3)}$$

and $$H^t = \begin{bmatrix} H_{xx}^t & H_{xy}^t & H_{xz}^t \\ H_{yx}^t & H_{yy}^t & H_{yz}^t \\ H_{zx}^t & H_{zy}^t & H_{zz}^t \end{bmatrix} \qquad \text{(B-4)}$$

This intermediate magnetic field is further related to the measured magnetic field $H^c$ by $$H^c = R_\phi^T H^t R_\phi \qquad \text{(B-5)}$$

where $$R_\phi = \begin{bmatrix} \cos\phi & \sin\phi & 0 \\ -\sin\phi & \cos\phi & 0 \\ 0 & 0 & 1 \end{bmatrix} \qquad \text{(B-6)}$$

The definitions of $\theta$ and $\phi$ are given in FIG. 3 and 4. Expanding eq. (B-5) gives $$H_{xx}^c = \cos^2\phi H_{xx}^t - \cos\phi\sin\phi H_{yx}^t - \sin\phi\cos\phi H_{xy}^t + \sin^2\phi H_{yy}^t \qquad \text{(B-7)}$$

$$H_{xy}^c = \cos\phi\sin\phi H_{xx}^t - \sin^2\phi H_{yx}^t + \cos^2\phi H_{xy}^t + \cos\phi\sin\phi H_{yy}^t$$

$$H_{xz}^c = \cos\phi H_{xy}^t - \sin\phi H_{yz}^t$$

$$H_{yx}^c = \cos\phi\sin\phi H_{xx}^t + \cos^2\phi H_{yx}^t - \sin^2\phi H_{xy}^t - \cos\phi\sin\phi H_{yy}^t$$

and $$H_{yy}^c = \sin^2\phi H_{xx}^t + \cos\phi\sin\phi H_{yx}^t + \sin\phi\cos\phi H_{xy}^t + \cos^2\phi H_{yy}^t \qquad \text{(B-8)}$$

$$H_{yz}^c = \sin\phi H_{xy}^t + \cos\phi H_{yz}^t$$

$$H_{zx}^c = \cos\phi H_{zx}^t - \sin\phi H_{zy}^t$$

$$H_{zz}^c = H_{zz}^t$$

If we closely examine Equations (B-7) and (B-8), we find that $$H_{xx}^c + H_{yy}^c = H_{xx}^t + H_{yy}^t \qquad \text{(B-9)}$$

$$H_{zz}^c = H_{zz}^t$$

Eq. (B-9) is the same as Eq. (29). The amplitudes of cross components are much smaller than those of the three main components over a layered earth. Neglecting cross components in Equation (B-7) leads to simplified angle estimation in Eqns. (8) and (9):

$$\tan 2\theta = \frac{2H_{xz}^t}{H_{xx}^t - H_{zz}^t} \qquad \text{(B-10)}$$

$$\tan 2\phi = \frac{2H_{xy}^c}{H_{xx}^c - H_{yy}^c}$$

The relative azimuth, $\phi$, can be calculated from the measured data using equation (B-10). We then rotate the measured magnetic field into the intermediate field $H^t$, and compute $\theta$ from equation (B-10).

APPENDIX C

Determination of Formation Azimuth Angle

Figure 6:
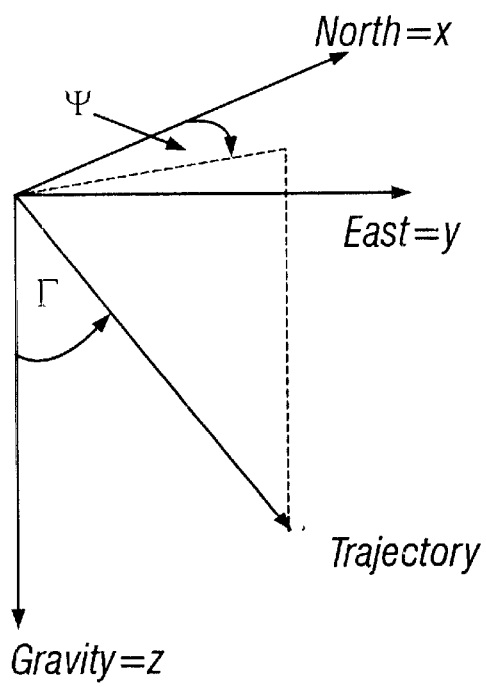
FIG. 6 how the position of a straight trajectory in space is described by two angles.
Figure 7:
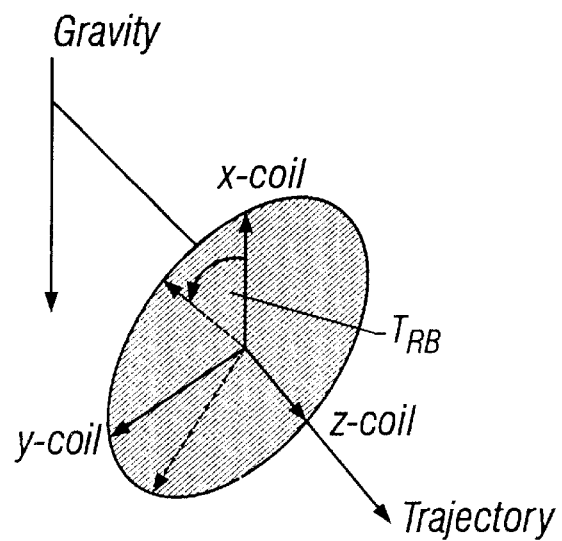
FIG. 7 shows two sequential rotations of the coils of the logging tool.

After the relative formation dip angle is determined, the formation azimuth angle can be calculated via post inversion process. To simplify math, let us consider a straight well trajectory. Mathematically, the three rotations discussed above and shown in FIGS. 6 and 7 may be expressed as follows:

$$\begin{bmatrix} i'_x \\ i'_y \\ i'_z \end{bmatrix} = \begin{bmatrix} \cos(T_{RB}) & \sin(T_{RB}) & 0 \\ -\sin(T_{RB}) & \cos(T_{RB}) & 0 \\ 0 & 0 & 1 \end{bmatrix} \times \begin{bmatrix} \cos\Gamma & 0 & -\sin\Gamma \\ 0 & 1 & 0 \\ \sin\Gamma & 0 & \cos\Gamma \end{bmatrix} \times \begin{bmatrix} \cos\Psi & \sin\Psi & 0 \\ -\sin\Psi & \cos\Psi & 0 \\ 0 & 0 & 1 \end{bmatrix} \begin{bmatrix} i_x \\ i_y \\ i_z \end{bmatrix} \quad (C-1)$$

where $i_x$, $i_y$ and $i_z$ are the unit vectors in the Earth coordinate system; $i_x'$, $i_y'$ and $i_z'$ are unit vectors in the tool coordinate system.; and $T_{RB}$ is the tool rotation angle.

The possible directions of the formation vector constitute a cone around the trajectory (FIG. 9). The angle between the cone generator and the trajectory equals θ. To determine the true orientation of the formation, the tool rotation angle, $T_{RB}$, must be used in combination with a cross-component measurement. The method of transforming the inversion results into true dip & azimuth angles includes the following steps:

1. Select the cone generator in the gravity/trajectory plane, above the trajectory.
2. Position the tool sensors as follows: z—along the trajectory; x—in the gravity trajectory plane, perpendicular to the trajectory and upwards. This is called the "principal position."
3. Calculate the magnetic tensor, H, defined in the principal tool system. Note that in the principal tool position, all cross-components are zero.

$$H = \begin{bmatrix} H_{xx} & 0 & H_{xz} \\ 0 & H_{yy} & 0 \\ H_{zx} & 0 & H_{zz} \end{bmatrix} \quad (C-2)$$

4. Rotate the tensor H about the trajectory $\phi^0$ to satisfy the individual measurements $H_{xx}^c$ and $H_{yy}^c$ in addition to the already satisfied sum $H_{xx}^c + H_{yy}^c$. Rotation of the tensor H is described by the following equation:

$$H' = \begin{bmatrix} H'_{xx} & H'_{xy} & H'_{xz} \\ H'_{yx} & H'_{yy} & H'_{yz} \\ H'_{zx} & H'_{zy} & H'_{zz} \end{bmatrix} = \begin{bmatrix} \cos\varphi & \sin\varphi & 0 \\ -\sin\varphi & \cos\varphi & 0 \\ 0 & 0 & 1 \end{bmatrix} \begin{bmatrix} H_{xx} & 0 & H_{xz} \\ 0 & H_{yy} & 0 \\ H_{zx} & 0 & H_{zz} \end{bmatrix} \begin{bmatrix} \cos\varphi & -\sin\varphi & 0 \\ \sin\varphi & \cos\varphi & 0 \\ 0 & 0 & 1 \end{bmatrix} \quad (C-3)$$

We can rotate H by the angle $T_{RB}$ to bring the sensors x and y from the principal position to the actual tool position. After the rotation, the sum of new components $$H'_{xx} + H'_{yy}$$

will have a correct value (as the sum is independent of the rotation angle) but the individual components will not correspond to the actual measurements. To satisfy the measurements, the formation vector must be rotated about the trajectory.

Instead of rotating the formation vector, one can rotate the tool in the opposite direction. Given this fact, the following algorithm may be used to satisfy each of the measured components $$H_{xx}^c + H_{yy}^c:$$

(a) Rotate the tensor H by a necessary angle φ to satisfy the following equation:

$$\frac{H'_{xx}}{H'_{yy}} = \quad (C-4)$$

$$\frac{\cos^2\varphi H_{xx} + \sin^2\varphi H_{yy}}{\sin^2\varphi H_{xx} + \cos^2\varphi H_{yy}} = \frac{(H_{xx} + H_{yy}) + (H_{xx} - H_{yy})\cos 2\varphi}{(H_{xx} + H_{yy}) - (H_{xx} - H_{yy})\cos 2\varphi} = \frac{H_{xx}^c}{H_{yy}^c}$$

(b) The solution to eq. (C-4) is not unique. Two angles φ and φ+π satisfy the equation. To resolve the non-uniqueness, the cross component $H'_{xz}$ is used. From eq. (C-3), this is $$H'_{xz} = H_{xz}\cos\Phi \quad (C-5)$$

Comparing the signs of calculated and measured components, from eq. (C-5), the correct solution of eq. (C-4) may be established. It is worth noting that the spacing for the component $H_{xz}$ differs from that of components $H_{xx}$ and $H_{zz}$. Theoretically, to obtain a correct synthetic value for $H'_{xz}$, eq. (C-3) must be recalculated with the correct spacing of the $H^{xz}$. Nevertheless, if we use only the sign of the $H'_{xz}$ component, eq. (C-3) may be sufficient with a single spacing.

Another non-uniqueness is related to the direction of the tool rotation. Both angles, φ and -φ, satisfy Equation (C-4). This non-uniqueness may be resolved using cross-component $H_{xy}$ (or $H_{yx}$). It follows from Equation (C-3):

$$H_{xy} = (-H_{xx} + H_{yy})\cos(\varphi)\sin(\varphi) = \frac{-H_{xx} + H_{yy}}{2}\sin(2\varphi) \quad (C-6)$$

The sign of the cross-component $H_{xy}$ allows us to determine the direction of the tool rotation. Remarks regarding the spacing of the cross-component $H_{zx}$ remain true for the cross-component $H_{xy}$. Let $\Phi_0$ be the solution to Equations (C-4) and (C-5).

(c) Select the cone generator at the angle $(-\Phi_0)$ and rotate both tool and formation about trajectory by the angle $T_{RB}$. Such a rotation puts sensors in their real positions with respect to the Earth coordinate system. At the same time, eq. (C-4) remains satisfied because the solution depends only on the relative position of the formation and sensor. After rotation, the selected cone generator moves from the angular position $(-\Phi_0)$ to the position $\Phi = -\Phi_0 + T_{RB}$. This is the formation vector F. The following equation describes the vector F:

$$F = \sin(F_{rel})[\cos(\Phi)i'_x - \sin(\Phi)i'_y] + \cos(F_{rel})i'_z \quad (C-7)$$

Here, vectors $i'_x$, $i'_y$, and $i'_z$ represent the orientation of the tool sensors in the principle position. They may be calculated from Equation (C-1) assuming $F_{RB}=0$:

$$\begin{pmatrix} i'_x \\ i'_y \\ i'_z \end{pmatrix} = \begin{pmatrix} \cos(T_{dip}) & 0 & -\sin(T_{dip}) \\ 0 & 1 & 0 \\ \sin(T_{dip}) & 0 & \cos(T_{dip}) \end{pmatrix} \begin{pmatrix} \cos(T_{daz}) & \sin(T_{daz}) & 0 \\ -\sin(T_{daz}) & \cos(T_{daz}) & 0 \\ 0 & 0 & 1 \end{pmatrix} \begin{pmatrix} i_x \\ i_y \\ i_z \end{pmatrix} \quad \text{(C-8)}$$

5. Project vector F into the gravity system using Equations (C-7) and (C-8):

$$F = \begin{bmatrix} F_x \\ F_y \\ F_z \end{bmatrix} = [\sin(F_{rel})\cos(\Phi) -\sin(F_{rel})\sin(\Phi) \ \cos(F_{rel})] \begin{bmatrix} i'_x \\ i'_y \\ i'_z \end{bmatrix} \quad \text{(C-9)}$$

6. Calculate the true formation dip $F_{dip}$ and azimuth $F_{az}$ from eq. (C-9)

$$\tan(F_{ax}) = \frac{F_y}{F_x} = \frac{\sin(F_{rel})[\cos(\Phi)\cos(T_{dip})\sin(T_{daz}) - \sin(\Phi)\cos(T_{daz})] + \cos(F_{rel})\sin(T_{dip})\sin(T_{daz})}{\sin(F_{rel})[\cos(\Phi)\cos(T_{dip})\cos(T_{daz}) + \sin(\Phi)\sin(T_{daz})] + \cos(F_{rel})\sin(T_{dip})\cos(T_{daz})} \quad \text{(C-10)}$$

and $$\cos(F_{dip}) = -\sin(F_{rel})\cos(\Phi)\sin(T_{dip}) + \cos(F_{rel})\cos(T_{dip}) \quad \text{(C-11)}$$

What is claimed is:

1. A method of logging of subsurface formations including a plurality of layers each having a horizontal resistivity and a vertical resistivity, the method comprising:
   (a) conveying an electromagnetic logging tool into a borehole in the subsurface formations;
   (b) obtaining multi-component measurements indicative of said horizontal and vertical resistivities using said logging tool;
   (c) defining a model of said plurality of layers, said model including a horizontal resistivity and a vertical resistivity associated with each of said plurality of layers, an azimuth angle and a inclination angle of said layers referenced to an earth coordinate system;
   (d) determining expected responses of the logging tool to said model;
   (e) defining a data objective function related to a difference between said expected responses and said multi-component measurements; and
   (f) using an iterative procedure including stabilization for updating the model to reduce said data objective function.

2. The method of claim 1 wherein the stabilization comprises:
   (a) defining a model objective function related to changes of component values of said model in successive iterations;
   (b) defining a global objective function as a weighted sum of the data objective function and the model objective function; and
   (c) updating the model to using a sensitivity of the global objective function to model parameters.

3. The method of claim 1 wherein said electromagnetic tool has an axis inclined to a normal to said layers.

4. The method of claim 1 wherein obtaining said multi-component measurements further comprises using at least one transmitter coil having an axis inclined to an axis of the logging tool.

5. The method of claim 1 wherein obtaining the multi-component measurements further comprises using at least one receiver coil having an axis inclined to an axis of the logging tool.

6. The method of claim 1 wherein obtaining the multi-component measurements further comprises using at least two receiver coils having an axis inclined to an axis of the logging tool.

7. The method of claim 1 wherein said multi-component measurements comprise $H_{xx}$, $H_{yy}$, and $H_{zz}$ measurements.

8. The method of claim 7 wherein the multicomponent measurements further comprise $H_{xy}$ and $H_{xz}$ measurements.

9. The method of claim 2 wherein the model objective function further comprises a weighted sum of individual objective functions related to said horizontal and vertical resistivities of the plurality of layers, the dip angle and the azimuth angle.

10. The method of claim 1 wherein the model objective function is related to a ratio of value of at least one component of the model after an iteration to a value of the at least one component before said iteration.

11. The method of claim 1 wherein determining said expected responses further comprises:
   (i) obtaining an azimuth and inclination of said borehole at a depth;
   (ii) obtaining a toolface orientation of said logging tool;
   (iii) determining from said obtained borehole inclination and depth and said obtained toolface orientation, a relative azimuth and inclination of the tool to the formations.

12. A method of logging of subsurface formations including a plurality of layers each having a horizontal resistivity and a vertical resistivity, the method comprising:
   (a) conveying an electromagnetic logging tool into a borehole in the subsurface formations;
   (b) obtaining multi-component measurements indicative of said horizontal and vertical resistivities using said logging tool;
   (c) defining a model of said plurality of layers, said model including a horizontal resistivity and a vertical resistivity associated with each of said plurality of layers, and a inclination angle of said layers referenced to an earth coordinate system;
   (d) determining expected responses of the logging tool to said model using a relative azimuth angle between the tool and the formation;
   (e) defining a data objective function related to a difference between said expected responses and said multi-component measurements; and
   (f) using an iterative procedure including stabilization for updating the model to reduce said data objective function.

13. The method of claim 12 further comprising summing $H_{xx}$ and $H_{yy}$ components of said measurements and using said summed component in the data objective function.

14. The method of claim 12 wherein said electromagnetic tool has an axis inclined to a normal to said layers.

15. The method of claim 12 wherein obtaining said multi-component measurements further comprises using at least one transmitter coil having an axis inclined to an axis of the logging tool.

16. The method of claim 12 wherein obtaining the multi-component measurements further comprises using at least one receiver coil having an axis inclined to an axis of the logging tool.

17. A method of logging of subsurface formations including a plurality of layers each having a horizontal resistivity and a vertical resistivity, the method comprising:
(a) conveying an electromagnetic logging tool into a borehole in the subsurface formations;
(b) obtaining multi-component measurements indicative of said horizontal and vertical resistivities using said logging tool;
(c) defining a model of said plurality of layers, said model including a horizontal resistivity and a vertical resistivity associated with each of said plurality of layers, an azimuth angle and a inclination angle of said layers referenced to an earth coordinate system; and
(d) defining a plurality of azimuth angles and, for each of said plurality of azimuth angles,
 (i) inverting said multi-component measurements to give a model and determining a data misfit for said model,
 (ii) determining one of said plurality of azimuth angles for which said data misfit attains a minimum value.

* * * * *